(12) United States Patent
Huang et al.

(10) Patent No.: US 6,445,480 B1
(45) Date of Patent: Sep. 3, 2002

(54) IMAGE SCANNING DEVICE WITH SWITCHING MECHANISM FOR SELECTIVELY SCANNING REFLECTIVE AND TRANSPARENT DOCUMENT

(75) Inventors: Yin-Chun Huang, Hsinchu; Chien-Liang Yeh, Tung Hsian, both of (TW)

(73) Assignee: Umax Data Systems Inc., Hsinchu (TW)

( * ) Notice: Subject to any disclaimer, the term of this patent is extended or adjusted under 35 U.S.C. 154(b) by 26 days.

(21) Appl. No.: 09/749,539

(22) Filed: Dec. 28, 2000

(51) Int. Cl.[7] .................................... G02B 26/08
(52) U.S. Cl. .................. 359/196; 358/483; 358/487; 358/474
(58) Field of Search ................... 259/196–226; 358/474, 482, 483, 487, 494, 496, 497

(56) References Cited

U.S. PATENT DOCUMENTS 6,081,363 A * 6/2000 Shen et al. ................. 359/196

* cited by examiner

*Primary Examiner*—James Phan
(74) *Attorney, Agent, or Firm*—Rosenberg, Klein & Lee

(57) ABSTRACT

An image scanning device with a switching mechanism arranged in an optical scanning module thereof for selectively scanning a reflective or transparent original document is disclosed. The optical scanning module includes a reflective optical path composed of a plurality of first group reflection mirrors and a first focusing lens and a transparent optical path composed a plurality of second group reflection mirrors and a second focusing lens. The second focusing lens of the transparent optical path is arranged at an angle with respect to the first focusing lens of the reflective optical path. An image sensing module is arranged adjacent to the light projecting outlets of the first and second focusing lens for selectively picking up the focused light beam from the first or second focusing lens. A switching mechanism is coupled to the image sensing module for rotating said image sensing module to align with the light projecting outlet of the first focusing lens or the light projecting outlet of the second focusing lens.

4 Claims, 9 Drawing Sheets

IMAGE SCANNING DEVICE WITH SWITCHING MECHANISM FOR SELECTIVELY SCANNING REFLECTIVE AND TRANSPARENT DOCUMENT

BACKGROUND OF THE INVENTION

1. Field of the Invention

The present invention relates to a scanner, and more particularly to a scanner with a switching mechanism for selecting a reflective optical path for scanning a reflective original document, or a transparent optical path for scanning a transparent original document.

2. Description of the Prior Art

The original document to be scanned with an scanner can be divided into two different categories, reflective and transparent. In order to effectively scan the image from the original document, the scanners are configured to reflective type for scanning reflective original document, and transparent type for scanning transparent original document.

Referring to FIGS. 1 and 2, a typical reflective type scanner is shown. The scanner 1 generally includes a top frame 11 with a document positioning plate 12 which is a plane surface made of for example glass or other light transmittable, substantially rigid material, for supporting an reflective original document 10 to be scanned, defining a document scanning window. A cover 13 is pivotally attached to the top frame 11 of the scanner 1 for covering the document positioning plate 12 during the scanning process.

The reflective type scanner 1 generally includes an optical scanning module 14 and a pair of guiding rails 15a, 15b. The optical scanning module 14 is provided with a light source 16, a plurality of light reflection mirrors 171, 172, 173, 174, a focusing lens 18, and an image sensing module 19 such as a Charge Coupling Device (CCD) or a Contact Image Scanning (CIS). The optical scanning module 14 may be moved by a driving device (not shown) along the guiding rails 15a, 15b. When the optical scanning module 14 completes a scanning process, the image of the reflective original document 10 is scanned.

As shown in FIGS. 3 and 4, a typical transparent type scanner 2 is shown. The scanner 2 also includes a top frame 21 and a document positioning plate 22. A back lighting module 23 is pivotally attached to the top frame 21 of the scanner 2. The back lighting module 23 is provided with a back light source 26 therein.

The transparent type scanner 2 includes an optical scanning module 24 moveably supported by a pair of guiding rails 25a, 25b. The optical scanning module 24 includes a plurality of reflection mirrors 271, 272, 273, a focusing lens 28, and an image sensing module 29. The optical scanning module 24 may be moved by a driving device (not shown) along the guiding rails 25a, 25b. When the optical scanning module 24 completes a scanning process and with the light provided by the back light source 26, the image of the transparent original document 20 supported on the document positioning plate 22 is scanned.

The conventional reflective or transparent scanner can only conduct a specific scanning mode, i.e. the reflective type scanner can not conduct a transparent scanning process, while the transparent type scanner can not conduct a reflective scanning process. In prior art, there is provided with a mode-selective scanner which is capable of selectively conducting reflective or transparent scanning processes. However, the scanner is too complicated to economically manufacture. In addition, it is too complicate to assemble.

Thus, it is desirable to provide an image scanning device with a switching mechanism which is capable of overcoming the problems described above and facilitating scanning operation.

SUMMARY OF THE INVENTION

Consequently, a primary object of the present invention is to provide an image scanning device with a switching mechanism. By means of the switching mechanism, the scanner is capable of conducting either a reflective scanning mode or a transparent scanning mode.

In order to achieve the object set forth, a scanner for selectively scanning reflective and transparent original document in accordance with the present invention comprises an optical scanning module having first and second light sources for selectively projecting light beam to a reflective original document or a transparent original document, respectively to generate a corresponding reflective or resulted image. A reflective optical path mechanism includes a plurality of first reflection mirrors and a first focusing lens for collecting the reflective image from the first reflection mirrors. A transparent optical path mechanism includes a plurality of second reflection mirrors and a second focusing lens for collecting the resulted image from the second reflection mirrors. An image sensing module is arranged adjacent to the first and second optical path mechanism for selectively picking up image from the first or second focusing lens. A switching mechanism is coupled to the image sensing module to selectively align the image sensing module to the first focusing lens to pick up the reflective image, or to the second focusing lens to pick up the resulted image.

According to another aspect of the present invention, a second focusing lens is provided thereby providing different resolutions.

To further understand the present invention, reference is made to the following detailed description of a preferred embodiment of the present invention, as well as the attached drawings, wherein:

DETAILED DESCRIPTION OF THE PREFERRED EMBODIMENT

Figure 5:
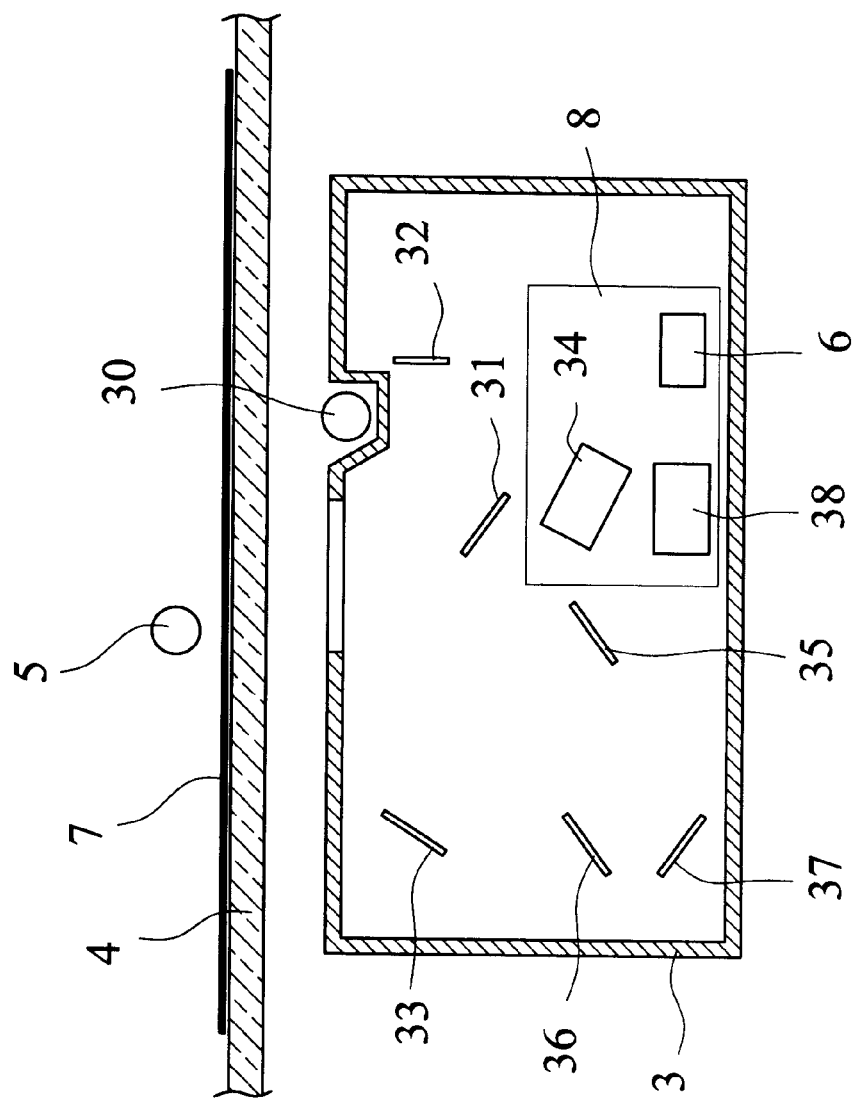
FIG. 5 is a schematic view showing a number of reflection mirrors, two focusing lenses, and an image sensing module are arranged in an optical scanning module of a scanner in accordance with a preferred embodiment of the present invention.

Referring to FIG. 5, an optical scanning module 3 is arranged in a housing of a scanner in accordance with the present invention and which is moveably along a pair of guiding rails arranged in the housing. A document positioning plate 4 is mounted on the housing of the scanner and arranged above the optical scanning module 3 for supporting an original document 7 thereon.

Figure 1:
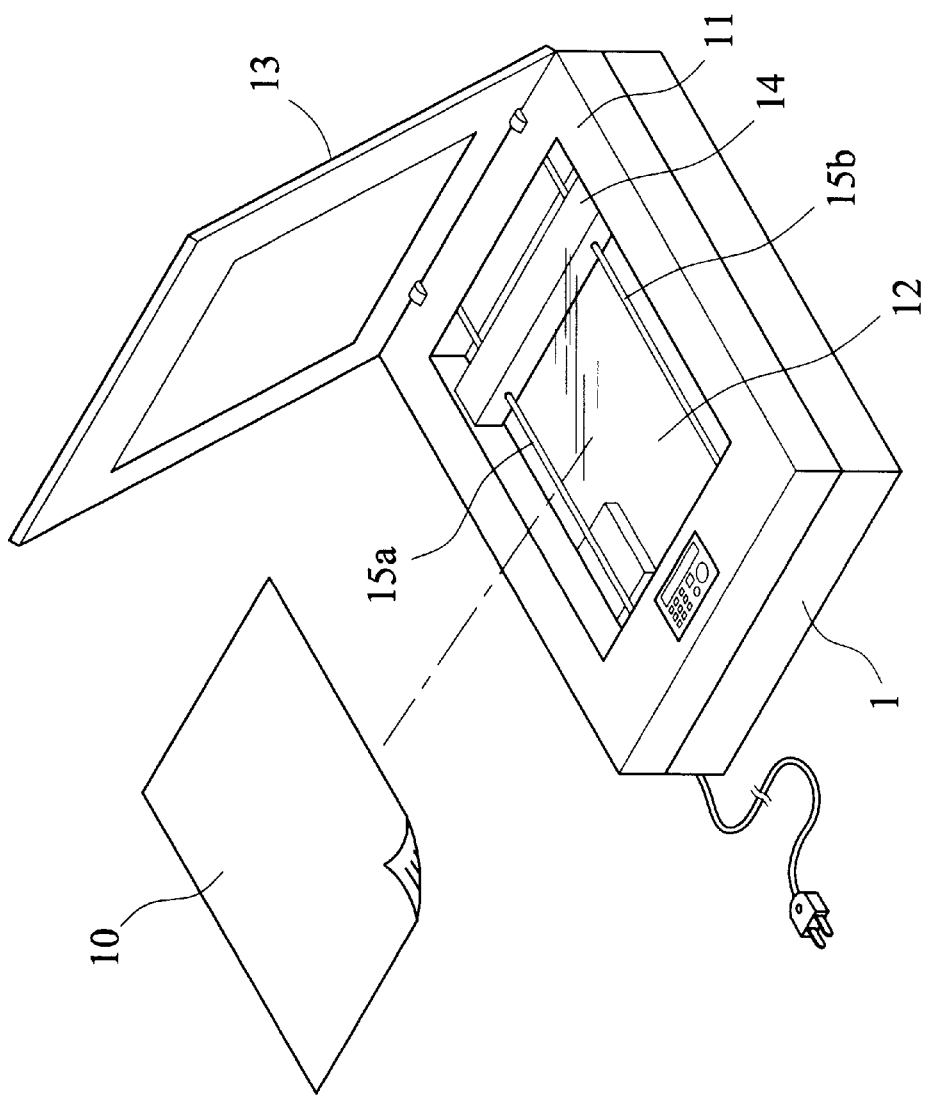
FIG. 1 is perspective view of a prior art reflective type scanner.
Figure 2:
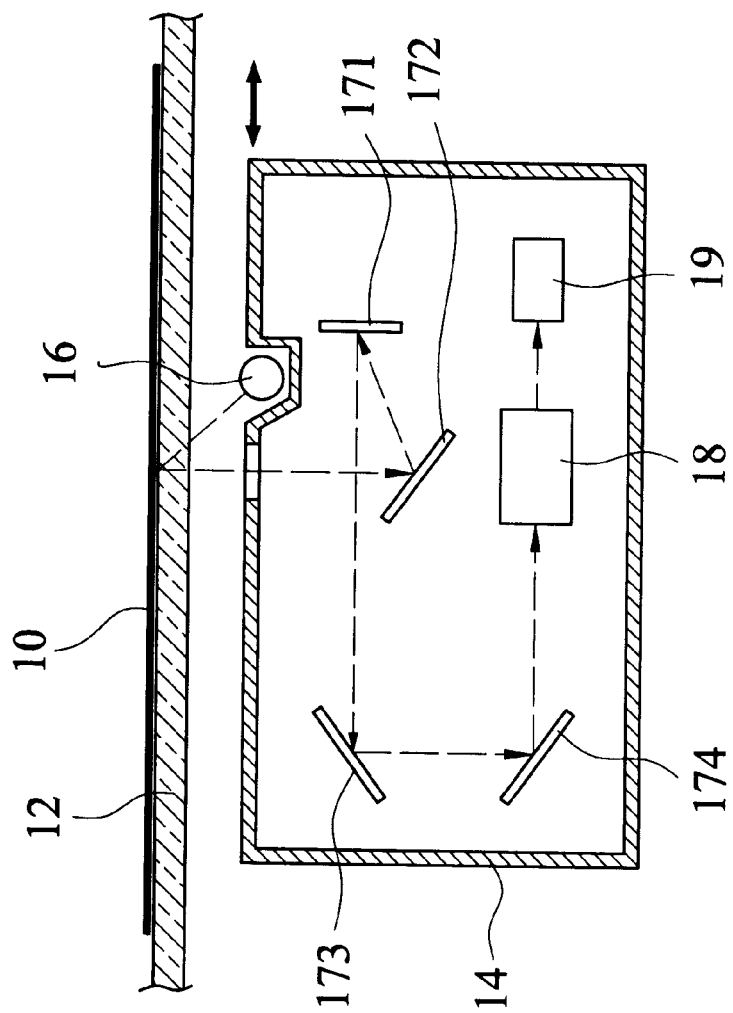
FIG. 2 is a schematic view showing an optical path in an optical scanning module of the reflective type scanner of FIG. 1.
Figure 3:
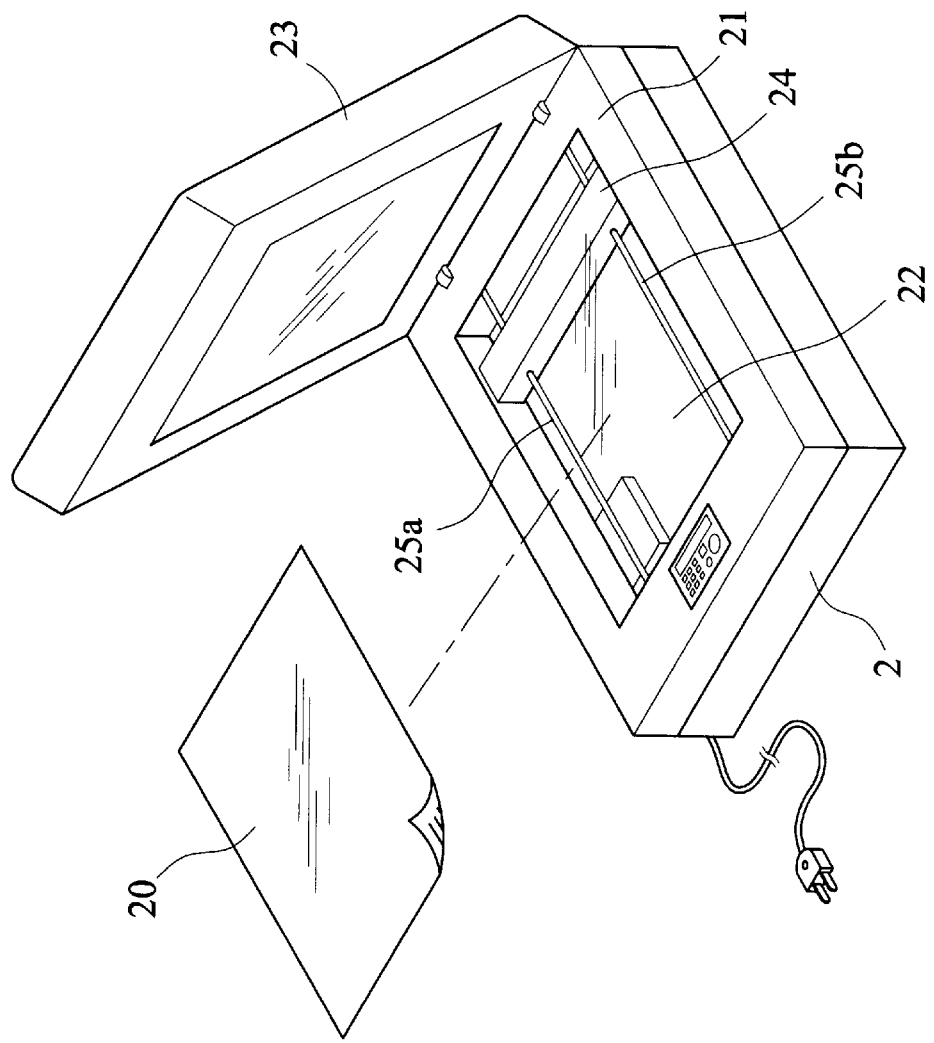
FIG. 3 is a perspective view of a prior art transparent type scanner.
Figure 4:
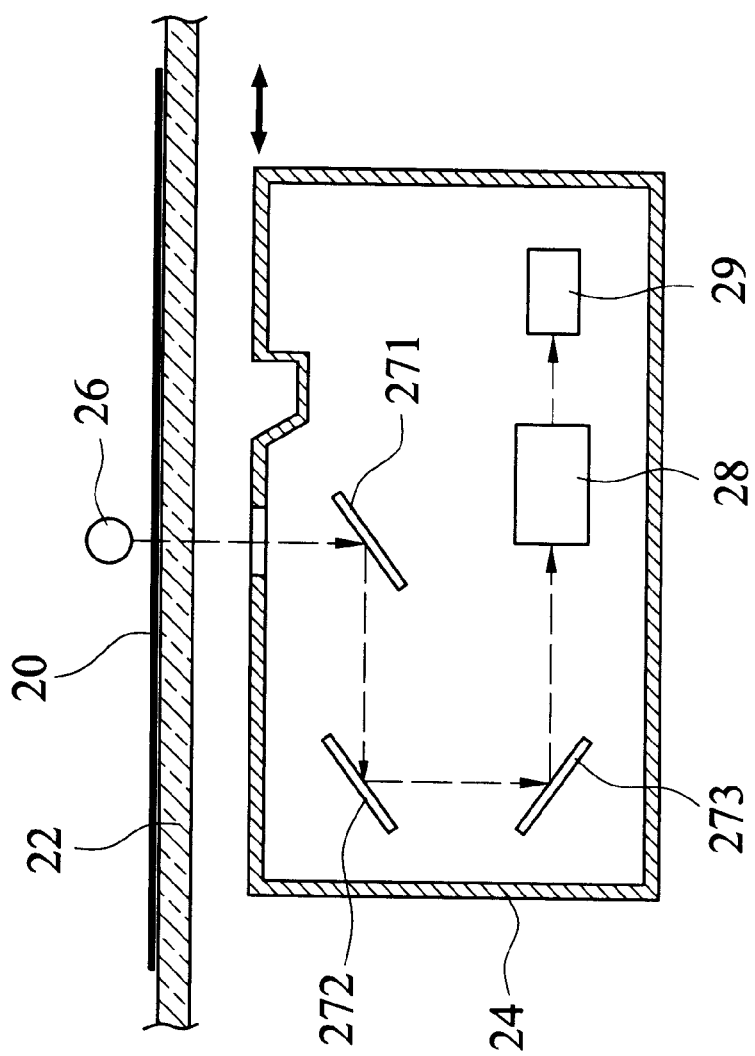
FIG. 4 is a schematic view showing an optical path in an optical scanning module of the transparent type scanner of FIG. 3.

The optical scanning module 3 is provided with a first light source 30 for providing light source during a reflective scanning process. Besides, a second light source 5 is arranged above the document positioning plate 4 for providing light source during a transparent scanning process. In general, the second light source 5 is arranged in a conventional back lighting module as shown in FIG. 3.

Figure 6:
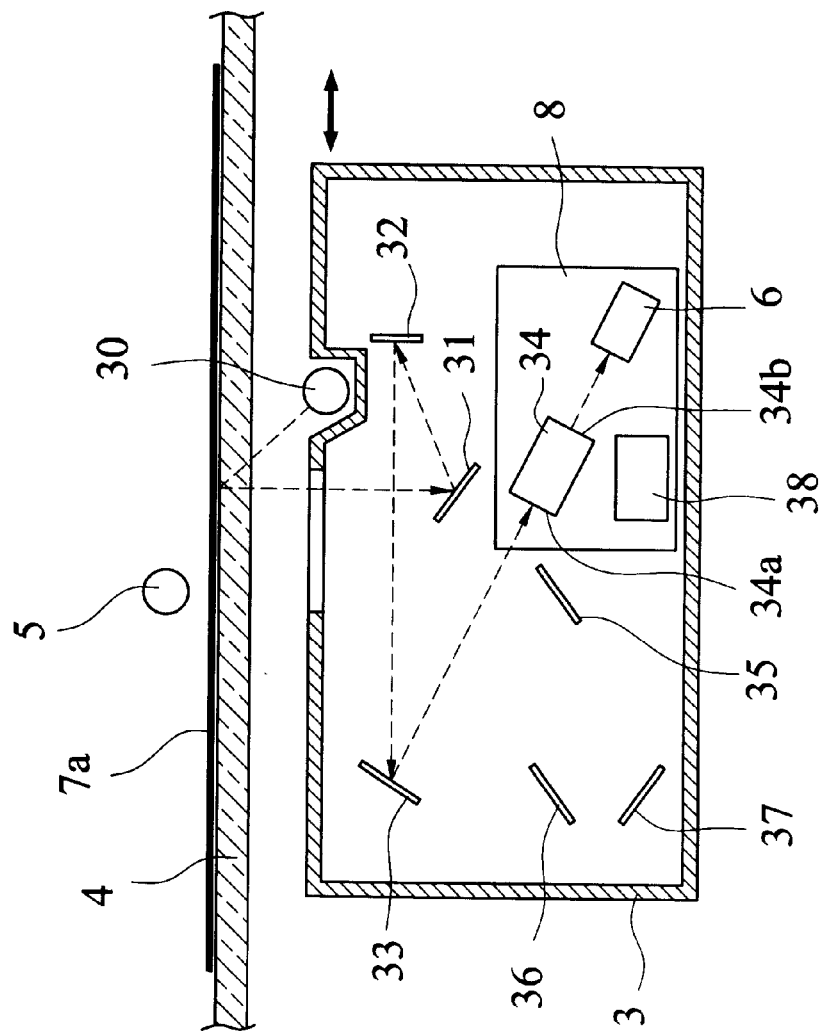
FIG. 6 is a schematic view showing a reflective optical path during scanning a reflective original document in accordance with the present invention.

The optical scanning module 3 includes a reflective image optical path mechanism which is configured by a plurality of light reflection mirrors 31, 32, 33, and a first focusing lens 34. When a reflective original document is to be scanned, as shown in FIG. 6, a light beam from the first light source 30 projects to a reflective original document 7a and the image of the document 7a will be reflected by the reflection mirrors 31, 32 and 33, and then projected to a light receiving inlet 34a of the first focusing lens 34. Then, the resulted image projects out from a light projecting outlet 34b of the lens 34. The image will be further processed.

Further, the optical scanning module 3 includes a transparent image optical path mechanism which is configured by a plurality of light reflection mirrors 35, 36, 37, and a second focusing lens 38. When a transparent original document is to be scanned, with reference to FIG. 7, a light beam from the second light source 5 projects to a transparent original document 7b and the image will be reflected by the reflection mirrors 35, 36 and 37, and then projected to a light receiving inlet 38a of the second focusing lens 38. Then, the resulted image projects out from a light projecting outlet 38b of the lens 38. The resulted image will be further processed.

An image sensing module 6, which typically includes an image sensing element such as Charge Coupled Device (CCD), is arranged adjacent to the first and second lens 34, 38. The image sensing module 6 is controlled by a switching mechanism 8 for selectively aligning the image sensing module 6 to the light projecting outlet 34a of the first focusing lens 34 or the light projecting outlet 38a of the second focusing lens 38. Accordingly, the reflective image from the first lens 34 or the resulted image from the second lens 38 can be selectively picked up by the image sensing module 6 for further processing.

When a reflective image scanning process is performed, the image sensing module 6 is rotated by the switching mechanism 8 to position on a first angle, as shown in FIG. 6, and in which the first focusing lens 34 is aligned. Accordingly, the reflective image from the first focusing lens 34 is picked up by the image sensing module 6.

Figure 7:
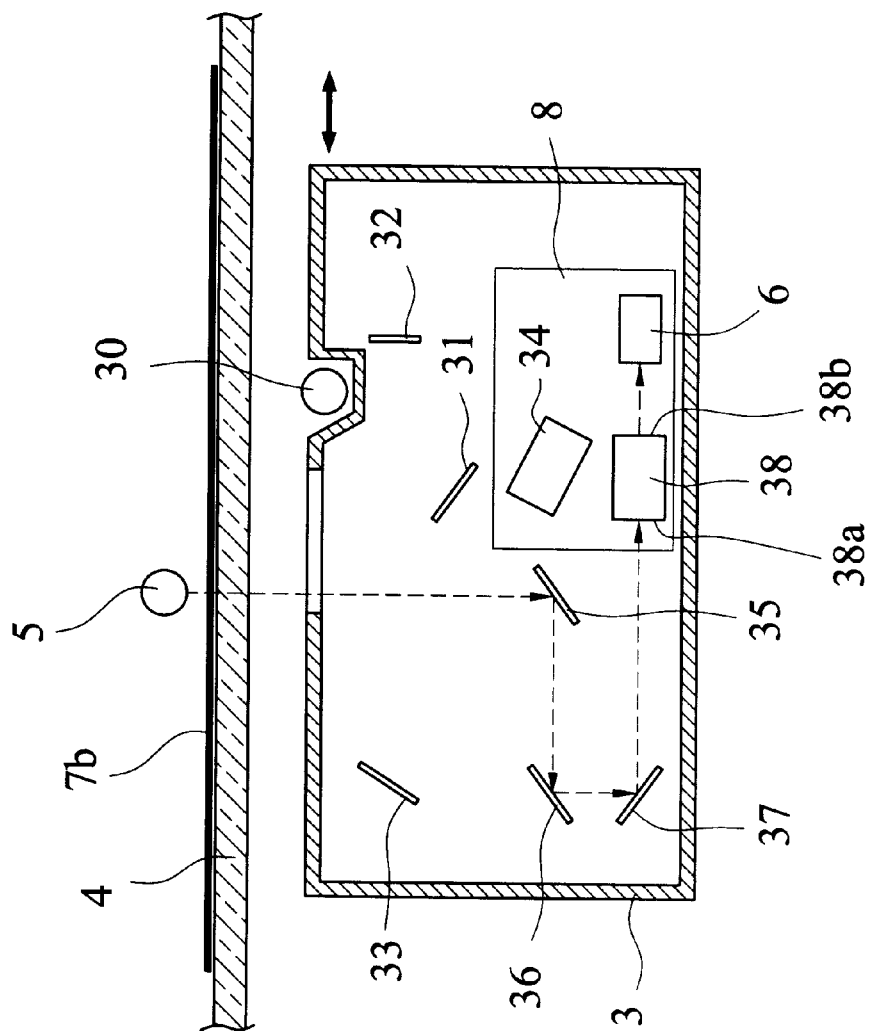
FIG. 7 is a schematic view showing a transparent optical path during scanning a transparent original document in accordance with the present invention.
Figure 9:
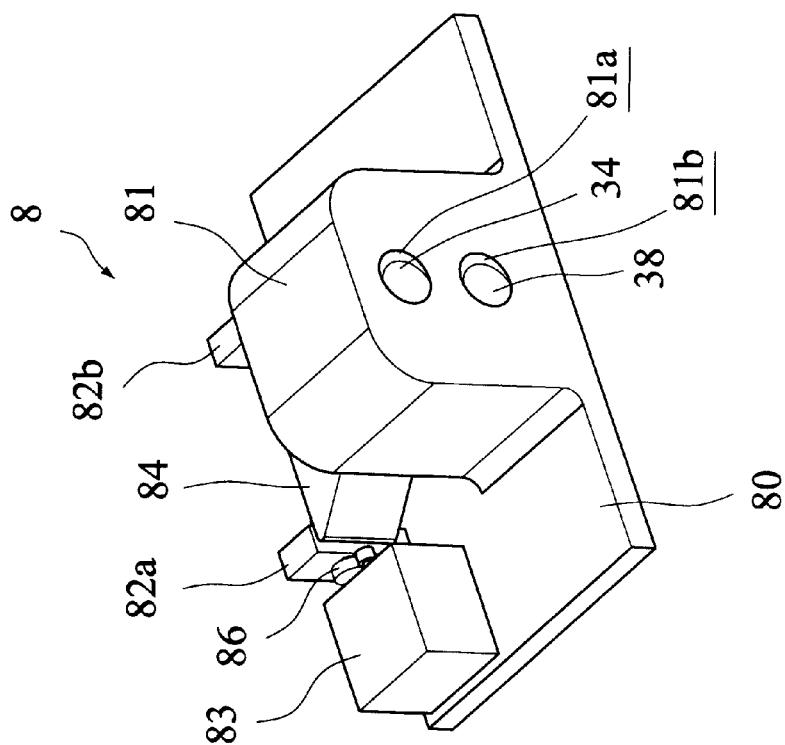
FIG. 9 is a perspective rear view of the switching mechanism of FIG. 8.
Figure 8:
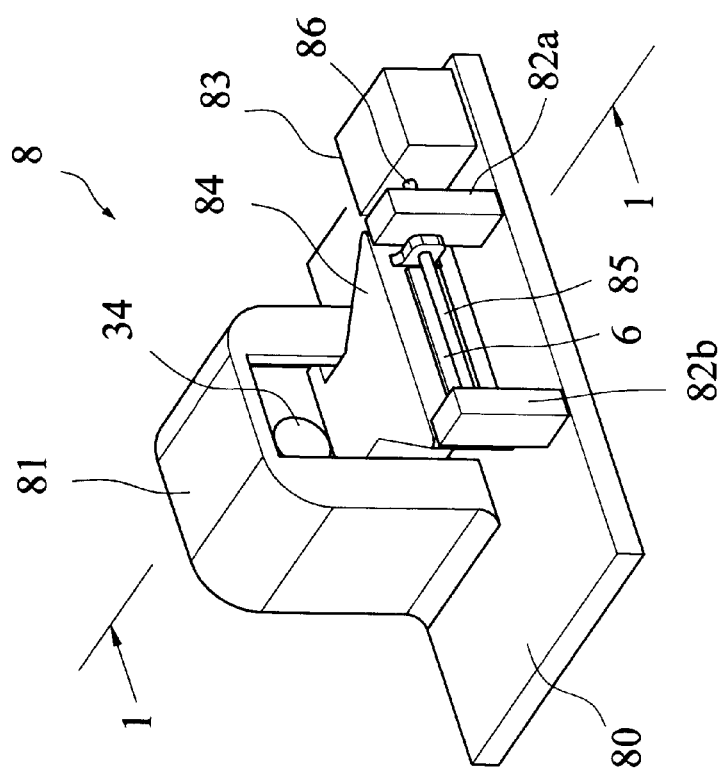
FIG. 8 is a perspective view of a switching mechanism in accordance with the present invention.

Alternatively, when a transparent image scanning process is performed, the image sensing module 6 is rotated by the switching mechanism 8 from the first position to a second position, as shown in FIG. 7, and in which the second focusing lens 38 is aligned. Accordingly, the resulted image from the second focusing lens 38 is picked up by the image sensing module 6.

Referring to FIGS. 8, 9, 10 and 11, the switching mechanism 8 in accordance with a preferred embodiment of the present invention is shown. The switching mechanism 8 includes a base plate 80 which is mounted in the optical scanning module 3. A lens holder 81 is arranged on the base plate 80. The lens holder 81 includes first and second passages 81a and 81b which are angularly arranged from each other therein. The first and second focusing lens 34 and 38 as shown in FIG. 5 are respectively mounted in the first and second passages 81a, 81b. So, the first focusing lens 34 of the transparent optical path is arranged at an angle with respect to the second focusing lens 38 of the reflective optical path.

Supporting plates 82a, 82b are mounted on the base plate 80 and arranged behind the lens holder 81. A driving mechanism 83 is arranged to one of the supporting plates 82a, 82b. In this embodiment, the driving mechanism 83 is a stepping motor which is capable of accurately rotating the image sensing module 6.

A CCD mounting member 84 is arranged between the supporting plates 82a, 82b and adjacent to the lens holder 81. The image sensing module 6 is fixedly mounted in the CCD mounting member 84. One end of the CCD mounting member 84 is coupled with a driving shaft 85. The driving shaft 85 is arranged between the supporting plates 82a, 82b and can be rotated by the driving mechanism 83 by an output shaft 86 of the driving mechanism 83.

Figure 10:
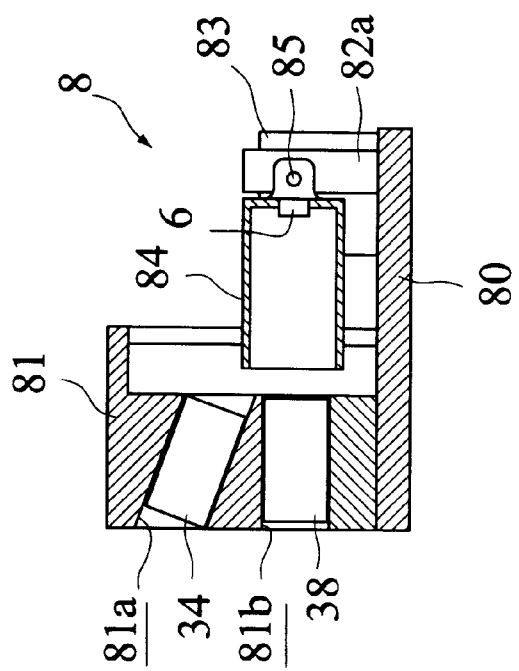
FIG. 10 is a cross sectional view taken along line 1—1 of FIG. 8 and in which an image sensing module is positioned in a second angle.

As discussed above, when a transparent image scanning process is selected, the image sensing module 6 is rotated to the second angle as the CCD mounting member 84 is driven by the driving mechanism 83, as clearly shown in FIG. 10. Accordingly, the resulted image from the second focusing lens 38 is picked up by the image sensing module 6.

Figure 11:
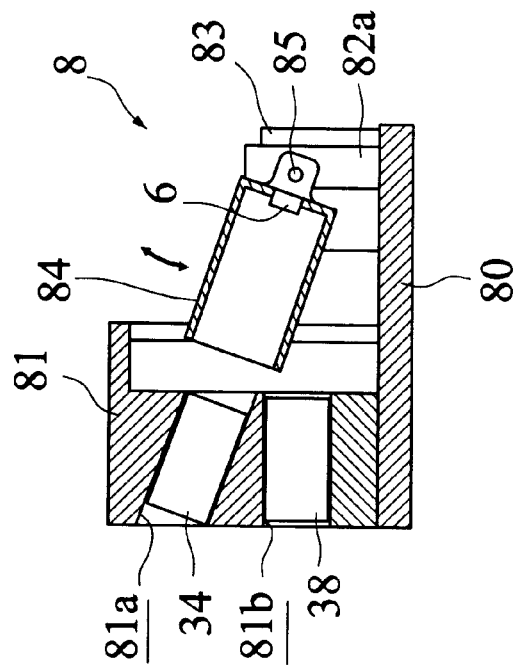
FIG. 11 similar to FIG. 10 in which the image sensing module is positioned in first angle.

When a reflective image scanning process is selected, the image sensing module 6 is rotated from the second angle to the first angle as the CCD mounting member 84 is driven by the driving mechanism 83, as clearly shown in FIG. 11. Accordingly, the transparent image from the second focusing lens 34 is picked up by the image sensing module 6.

In addition, the optical feature of the first and second focusing lens 34, 38 can be specially selected such that they can achieve different scanning resolution. As a result, a better result can be achieved.

While the present invention has been described with reference to the specific embodiment, the description is illustrative of the invention and is not to be construed as limiting the invention. Therefore, various modifications to the present invention can be made to the preferred embodiments by those skilled in the art without departing from the true spirit and scope of the invention as defined by the appended claims.

We claim:

1. An image scanning device with an optical scanning module for scanning a reflective document by incorporating with a first light source or a transparent document by incorporating with a second light source, comprising:

a reflective optical path comprising a plurality of first group reflection mirrors arranged in the optical scanning module for reflecting a light beam projected from the first light source, and a first focusing lens having a light receiving inlet and a light projecting outlet for projecting a focused light beam of the reflective optical path;

a transparent optical path comprising a plurality of second group reflection mirrors arranged in the optical scanning module for reflecting a light beam projected from the second light source, and a second focusing lens having a light receiving inlet and a light projecting outlet for projecting a focused light beam of the transparent optical path, the second focusing lens being arranged at an angle with respect to the first focusing lens of the reflective optical path;

an image sensing module arranged adjacent to the light projecting outlets of the first and second focusing lens for selectively picking up the focused light beam from said first or second focusing lens; and a switching mechanism for rotating said image sensing module to align with the light projecting outlet of the first focusing lens or the light projecting outlet of the second focusing lens.

2. The image scanning device as recited in claim 1, wherein said switching mechanism comprising:

a base plate mounted in the optical scanning module;

a lens holder mounted on the base plate, provided with a first passage for containing the first focusing lens therein and a second passage for containing the second focusing lens therein;

a CCD mounting member pivotally arranged adjacent to the first focusing lens and the second focusing lens, the image sensing module being fixedly mounted in the CCD mounting member; and a driving mechanism for rotating the CCD mounting member to make the image sensing module face toward the first focusing lens or toward the second focusing lens.

3. The image scanning device as recited in claim 2, wherein said driving mechanism comprises a stepping motor.

4. The scanner as recited in claim 2, wherein said switching mechanism comprises a driving shaft coupled to the CCD mounting member and supported by a pair of supporting plates mounted on the base plate.

\* \* \* \* \*